US009107450B2

(12) United States Patent
Nakamura et al.

(10) Patent No.: US 9,107,450 B2
(45) Date of Patent: Aug. 18, 2015

(54) PECTIC POLYSACCHARIDE AND METHOD FOR PRODUCING SAME

(75) Inventors: Akihiro Nakamura, Tsukubamirai (JP); Junko Tobe, Tsukubamirai (JP); Norifumi Adachi, Tsukubamirai (JP)

(73) Assignee: FUJI OIL COMAPNY LIMITED, Osaka (JP)

( * ) Notice: Subject to any disclaimer, the term of this patent is extended or adjusted under 35 U.S.C. 154(b) by 0 days.

(21) Appl. No.: 14/128,120

(22) PCT Filed: Jun. 21, 2012

(86) PCT No.: PCT/JP2012/065907
§ 371 (c)(1),
(2), (4) Date: Dec. 20, 2013

(87) PCT Pub. No.: WO2012/176852
PCT Pub. Date: Dec. 27, 2012

(65) Prior Publication Data
US 2014/0134310 A1    May 15, 2014

(30) Foreign Application Priority Data

Jun. 24, 2011    (JP) ................................. 2011-140669

(51) Int. Cl.
*A23L 2/66*    (2006.01)
*A23L 2/52*    (2006.01)
*A23L 2/68*    (2006.01)
*A23L 1/0526*    (2006.01)
(Continued)

(52) U.S. Cl.
CPC . *A23L 2/66* (2013.01); *A23C 9/137* (2013.01); *A23C 11/106* (2013.01); *A23L 1/0526* (2013.01); *A23L 2/52* (2013.01); *A23L 2/68* (2013.01); *C08B 37/0003* (2013.01); *C08B 37/0045* (2013.01)

(58) Field of Classification Search
CPC .............................. A23L 1/062; A23L 1/0524
USPC .......... 426/615, 629, 634, 577, 507, 580, 590
See application file for complete search history.

(56) References Cited

U.S. PATENT DOCUMENTS 6,221,419 B1    4/2001    Gerrish
2003/0157236 A1    8/2003    Huang
(Continued)

FOREIGN PATENT DOCUMENTS

CN    1288471    3/2001
CN    1867266    11/2006
(Continued)

OTHER PUBLICATIONS

International Search Report from the Japanese Patent Office in corresponding International Application No. PCT/JP2012/065907, mailed Jul. 17, 2012, pp. 1-2.
(Continued)

*Primary Examiner* — Helen F Heggestad
(74) *Attorney, Agent, or Firm* — Stephen J. Weyer, Esq.; Stites & Harbison, PLLC.

(57) ABSTRACT

The present invention provides a pectic polysaccharide, wherein a degree of methyl esterification of constituent galacturonic acid is 45% or less, a structure of a single molecule observed with an atomic force microscope comprises a star structure, and a diameter of the molecule is more than 100 nm and equal to or less than 200 nm.

15 Claims, 2 Drawing Sheets

(51) Int. Cl.
*C08B 37/00* (2006.01)
*A23C 9/137* (2006.01)
*A23C 11/10* (2006.01)

(56) References Cited

U.S. PATENT DOCUMENTS

2005/0158443 A1 7/2005 Grebenkamper et al.
2006/0210668 A1* 9/2006 Thorsoe et al. ................. 426/42

FOREIGN PATENT DOCUMENTS

| JP | 2599477 | B2 | 4/1997 |
| JP | 2000-273101 | A | 10/2000 |
| JP | 2001-354702 | A | 12/2001 |
| JP | 2002-030102 | A | 1/2002 |
| JP | 3280768 | B2 | 5/2002 |
| JP | 2002-330710 | A | 11/2002 |
| WO | WO 2005/084461 | A1 | 9/2005 |
| WO | WO 2008/149738 | A1 | 11/2008 |

OTHER PUBLICATIONS

Supplementary European Search Report dated Jan. 27, 2015 in corresponding European Application No. 12 80 2192.
Office Action dated Jun. 3, 2015 in corresponding Chinese Application No. 201280030037.8.
Renard, et al. "The xylose-rich pectins from pea hulls", 1997, pp. 155-162, vol. 21, International Journal of Biological Macromolecules.

* cited by examiner

PECTIC POLYSACCHARIDE AND METHOD FOR PRODUCING SAME

TECHNICAL FIELD

The present invention relates to a pectic polysaccharide, a method for producing the same, a dispersion stabilizer of protein such as acidic protein beverages, and an acidic protein beverage using these dispersion stabilizer. More specifically, the present invention relates to an acidic protein beverage wherein a pectic polysaccharide contained in pea is used as a dispersion stabilizer to suppress aggregation and precipitation of the protein produced under acidic conditions.

BACKGROUND ART

Beverages prepared by fermenting beverages containing protein such as milk or soybean milk with lactic acid bacteria, or beverages prepared by directly adding an organic acid to beverages containing these protein are called acidic protein beverages. These acidic protein beverages are favored as beverages having refreshing sourness, but under acidic conditions, particularly under conditions that are more acidic than the vicinity of the isoelectric point of the protein, the protein aggregates and precipitates, and their value as commercial products is significantly impaired. Then, with an aim of dispersion stabilization of protein, dispersion stabilizers, such as high methoxyl pectin and carboxymethylcellulose have been used (Patent Literature 1). These conventional dispersion stabilizers are considered to electrostatically react with protein particles, as well as to form a weak network of polysaccharides in a beverage to suppress aggregate precipitation of protein by imparting viscosity, and had a problem of imparting characteristic viscosity to the beverage (Non Patent Literature 1).

In contrast, water-soluble soybean polysaccharides made by extracting polysaccharides contained in cotyledons of soybean seeds, which have a function to suppress aggregate precipitation of protein under acidic conditions like high methoxy pectin and carboxymethylcellulose, have been used as stabilizers for acidic protein beverages (Patent Literature 2). Water-soluble soybean polysaccharides electrostatically react with protein particles, suppress their aggregation by covering the surfaces of the protein particles, and stabilize the protein particles by fining the protein particles using homogenization treatment to an extent in which the particles can be dispersed by Brownian movement. Thus, the polysaccharides provide acidic milk-based beverages with a refreshing light taste, without imparting viscosity (Non Patent Literature 2).

Incidentally, acidic protein beverages can be made as beverages in various pHs that are at the vicinity of the isoelectric point of the protein or lower. In the range of pH 4.2 to pH 4.5 at the vicinity of the isoelectric point of milk protein among these, the surface charge of the protein is in a non-charged to slightly positive-charged state, and strongly negative-charged polysaccharides show a good dispersion stabilizing ability. Thus, high methoxy pectin, carboxymethylcellulose, and polymeric water-soluble soybean polysaccharides show good dispersion stability (Patent Literature 3). In contrast, under more acidic conditions at pHs lower than pH 4.2, the surface charge of protein is more strongly positive-charged. As for the strongly negative-charged polysaccharides described above, since a strong reaction with protein particles occurs to cause aggregate precipitation called depression, a good stable state cannot be achieved. In this pH range, weakly negative-charged water-soluble soybean polysaccharides show good dispersion stability.

In this way, in the conventional art, it was necessary to select an optimal stabilizer depending on the pH to be used. However, if a stabilizer applicable in a wide pH range can be obtained, industrial effects are very large because the stabilizer can prevent water separation from an acidic protein beverage in an overfermented state, and additionally, a plurality of products can be prepared from a single raw material by performing fermentation using various pHs as the end point. Not individual dispersion stabilizers used in a particular pH range described above, but a dispersion stabilizer that disperses and stabilizes protein under conditions from the vicinity of the isoelectric point of the protein to acidic conditions, specifically in a wide pH range from pH 3.2 to 4.8, particularly from pH 3.4 to pH 4.5 and without imparting viscosity to the beverage and that can maintain the stability of the beverage has been strongly required.

CITATION LIST

Patent Literature

Patent Literature 1: Japanese Patent No. 2599477
Patent Literature 2: Japanese Patent No. 3280768
Patent Literature 3: WO 2008/149738

Non Patent Literature

Non Patent Literature 1: Food Hydrocolloids, 17, 333-343, 2003
Non Patent Literature 2: J. Agric. Food Chem., 54 (17), 6241-6246, 2006

SUMMARY OF INVENTION

Technical Problem

An object of the present invention is to provide a dispersion stabilizer for suppressing aggregate precipitation of protein under acidic conditions, particularly in the entire wide pH range of pH 3.2 to 4.8, particularly of pH 3.4 to pH 4.5, which is more acidic than the vicinity of the isoelectric point of the protein, and for providing an acidic protein beverage of low viscosity and with a refreshing taste.

Solution to Problem

As a result of intensive studies on the above-described problem, the present inventors have found that, among pectic polysaccharides included in cell wall saccharides derived from pea seeds, molecules whose degrees of methyl esterification of constituent galacturonic acid are 30% or less and which have a star structure whose molecular diameter is more than 100 nm and equal to or less than 200 nm can stabilize dispersion of protein particles in a wide pH range of pH 3.2 to 4.8, particularly of pH 3.4 to pH 4.5, and that the polysaccharides whose degrees of methyl esterification are 40% can stabilize dispersion of protein particles in a pH range around 3.2, thus having completed the present invention.

Therefore, the present invention is:
(1) a pectic polysaccharide, wherein the degree of methyl esterification of constituent galacturonic acid is 45% or less, the structure of a single molecule observed with an atomic force microscope comprises a star structure, and the diameter of the molecule is more than 100 nm and equal to or less than 200 nm;
(2) the pectic polysaccharide according to (1), wherein the degree of esterification is 30% or less;

(3) the pectic polysaccharide according to (1), wherein the degree of esterification is 35% to 45%;

(4) the pectic polysaccharide according to (1), wherein, among the constituents, a polymeric component whose molecular weight is 10,000 or more has a molecular rotation radius of 25 nm to 40 nm when dispersed in an aqueous medium and an average absolute molecular weight of 500,000 to 1,000,000;

(5) the pectic polysaccharide according to any of (1) to (4), wherein the pectic polysaccharide comprises arabinose, galactose, glucose, rhamnose, xylose, fucose, and galacturonic acid as constituent saccharides, and the arabinose content is 30% by weight or more;

(6) the pectic polysaccharide according to any of (1) to (5), derived from beans;

(7) the pectic polysaccharide according to (6), derived from a pea seed;

(8) a method for producing pectic polysaccharide, comprising:
obtaining a pectic polysaccharide by extracting from a pea seed or fibrous fraction thereof as a raw material with a n aqueous medium of pH 3 to pH 12;
decomposing the pectic polysaccharide such that a degree of methyl esterification becomes 45% or less;

(9) a dispersion stabilizer for protein, using the pectic polysaccharide according to any of (1) to (7) or the pectic polysaccharide produced in the production method according to (8);

(10) the dispersion stabilizer according to (9) for an acidic protein beverage whose protein content is 1% by weight or more in the beverage;

(11) an acidic protein beverage, using the dispersion stabilizer according to (9) or (10);

(12) an acidic protein beverage whose protein content is 1% by weight or more in the beverage, using the dispersion stabilizer according to (9) or (10);

(13) a method for stabilizing dispersion in a protein beverage, using the pectic polysaccharide according to any of (1) to (7) or the pectic polysaccharide produced in the production method according to (8);

(14) the method for stabilizing dispersion in a protein beverage according to (13) for an acidic protein beverage whose protein content is 1% by weight or more in the beverage;

(15) use of the pectic polysaccharide according to any of (1) to (7) or the pectic polysaccharide produced in the production method according to (8) for dispersion stabilization of an protein beverage; and (16) the use of the pectic polysaccharide according to (15) in an acidic protein beverage whose protein content is 1% by weight or more.

Advantageous Effects of Invention

According to the present invention, it is possible to suppress aggregate precipitation of protein in a wide pH range of pH 3.2 to 4.8, particularly pH 3.4 to pH 4.5, in which protein conventionally aggregates and precipitates, and to provide an acidic protein beverage of low viscosity and with a refreshing taste in a system of, for example, 3% by weight nonfat milk solids (1% by weight of protein in the system) or more. It becomes possible to prepare an acidic protein beverage in which the growth of lactic acid bacteria is maintained in a range from pH 4.2 to pH 4.5 and to suppress generation of protein aggregates over time due to overfermentation. Alternatively, when sterilized type acidic protein food is prepared in a range of pH 3.2 to 4.8, particularly of pH 3.4 to pH 4.5, it is possible to suppress denaturation of the protein due to heat sterilization and generation of aggregates and to provide an acidic protein beverage of stabilized quality. Furthermore, it is also possible to provide an acidic protein beverage having strong acidity from pH 3.2 or more to less than pH 3.4.

DESCRIPTION OF EMBODIMENTS (Structure)

Figure 1:
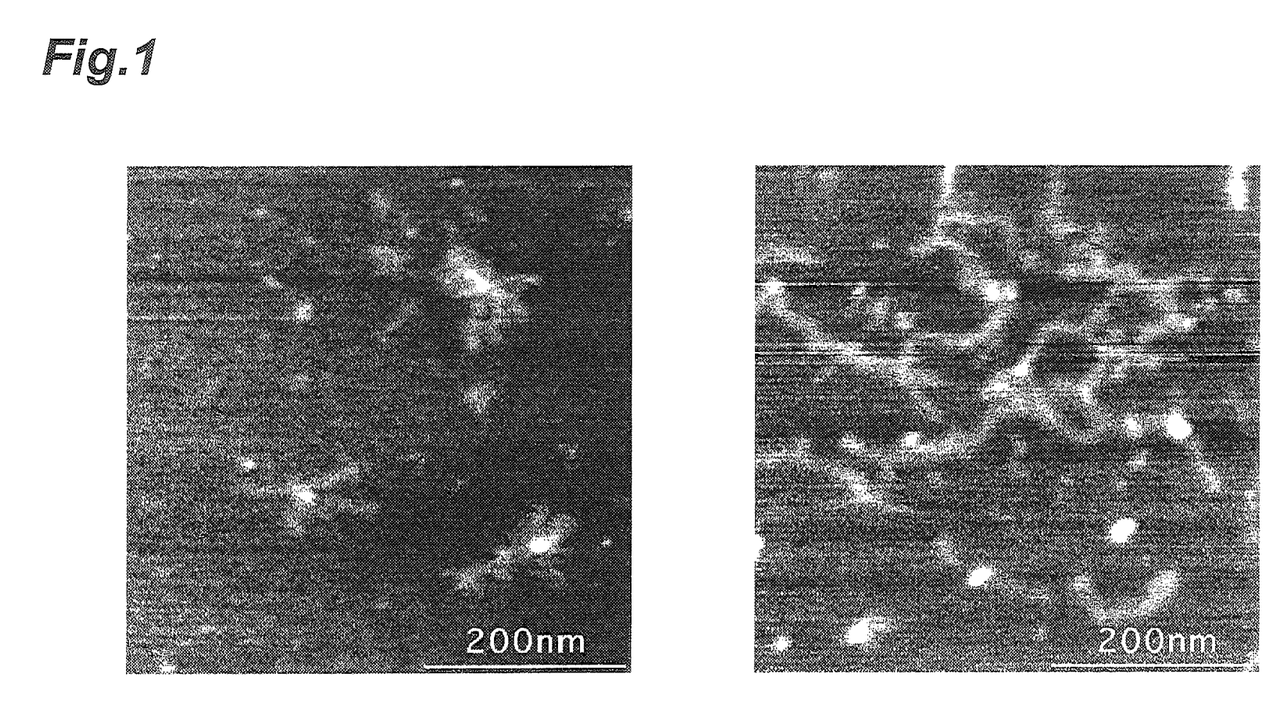
FIG. 1 is images observed with an atomic force microscope of molecular structures of pectic polysaccharides obtained from pea seeds (left) and of pectin molecules derived from citrus fruit peel (right).

Hereinafter, the present invention will be specifically described. Characteristics of the pectic polysaccharides of the present invention are that their molecular shape is different from that of pectin having a linear structure with few branches extracted from the conventional citrus fruit peel or apple peel, that a single molecule observed with an atomic force microscope has a star structure with a molecular diameter of more than 100 nm and equal to or less than 200 nm, and additionally that the degree of methyl esterification of constituent galacturonic acid is 45% or less, preferably 30% or less. The star structure in the present invention is a counterpart of a linear chain structure or a spherical structure, and has a structure in which about 3 to 20 linear side chains having a comparable length are branched from the main chain, for example. Despite pectic polysaccharides obtained using the same raw materials, it is not possible to achieve the dispersion stabilizing effect of the present invention by pectic polysaccharides less than 100 nm or more than 200 nm, or by spherical or linear pectic polysaccharides, or the like, which do not have a star structure, as well as by polysaccharides whose degrees of methyl esterification are more than 45%. In exemplifying an observation of a molecular structure used in the present invention of pectic polysaccharides obtained from pea seeds, which is one example of the present invention, a 0.1% by weight aqueous solution of the polysaccharide is prepared, purified water and a surfactant TWEEN 20 are added, the solution is diluted to 1 ppm pectic polysaccharides and 1 mM TWEEN 20, and then, the solution is dropped on mica to be naturally dried. It is possible to identify the structure by observing the structure in the DFM mode of an atomic force microscope (SII: SPI3800N, SPA300HV) with a 20 N/m cantilever. The images of the molecular structure of pectic polysaccharides obtained from pea seeds (left) and the molecular structure of pectin molecules derived from citrus fruit peel (right) observed with the atomic force microscope are shown in FIG. 1.

(Molecular Weight)

The pectic polysaccharides of the present invention include polymeric components whose molecular weights are 10,000 or more as constituents, and the polymeric components are defined as fractions of those whose molecular weights are recognized to be 10,000 or more as analyzed with gel filtration under the following conditions. The molecular rotation radius of these polymeric fractions is preferably 25 nm to 40 nm, more preferably 30 nm to 40 nm, and their average absolute molecular weight (MM) is preferably 500,000 to 1,000,000, more preferably 800,000 to 900,000. Additionally, it is preferred that the molecular weight does not exceed 5,000,000.

In gel filtration, HPLC (TSK-gel G-5000PWXL: TOSOH CORPORATION φ 7.8 mm×300 mm) is used, and the molecular weight is determined by calculation from a standard pullulan P-82 (Showa Denko K. K.). Additionally, the molecular rotation radius is determined by means of static light scattering (HPLC-MALLS). The analysis is performed under the following conditions; an eluant: a 50 mM sodium acetate aqueous solution (pH 5.0) and a flow rate: 1.0 mL/min on a RI detector and an MALLS detector.

(Constituent Saccharides)

For pectic polysaccharides of the present invention, those including arabinose, galactose, glucose, rhamnose, xylose, fucose, and galacturonic acid as constituent saccharides are preferred. It is further preferred that the arabinose content is 30% or more. Additionally, although a carboxyl group in the 6-position in galacturonic acid has been methyl-esterified, it is important that the degree of methyl esterification that indicates methyl-esterified galacturonic acid included in all the galacturonic acid molecules is 45% or less, preferably 30% or less. When the degree of esterification is 30% or less, it is possible to perform stabilization in a wide pH range of pH 3.2 to 4.8. Even if the degree of esterification is from 30 to 45%, it is possible to perform stabilization in a pH range of pH 3.2 to 4.4. When the degree of esterification exceeds 45%, the pH range in which protein is dispersed and stabilized is narrowed to pH 3.4 to 4.0, and the stability in the entire wide pH range, which is a subject of the invention, is impaired. In this context, the galacturonic acid content in the pectic polysaccharides is measured with the colorimetry method using the Blumenkrantz method, and the composition of neutral sugar, after decomposition by sulfuric acid, is measured with ion chromatography method (HPLC-PAD method) using an electrochemical detector.

(Extraction)

As plant raw materials, beans such as pea, kidney bean, mung bean, broad bean, marrowfat, and chickpea are preferred, and pea is particularly preferred as the raw material. Industrially, it is preferred to extract, as the raw material, a fiber fraction from which protein fractions and starch fractions included in these beans have been removed. As for pH at extraction, since hydrolysis of polysaccharides is facilitated under acidic conditions less than pH 3 and elimination and decomposition of polysaccharides are facilitated under alkaline conditions more than pH 12, a pH from 3 to 12 is appropriate, and a pH from 4 to 10 is preferred. After addition of water to the raw material, and then, adjustment to a range of pH 3 to pH 12 with addition of an acid or alkaline, pectic polysaccharides are extracted preferably at a temperature of 60° C. or more to 150° C. or less, more preferably at a temperature of 80° C. or more to 130° C. or less. At a temperature less than 60° C., the extraction efficiency of pectic polysaccharides is poor, and less practical. At a temperature more than 150° C., there may be a case where pectic polysaccharides are hydrolyzed during the extraction process and it is impossible to maintain a star structure. The extraction period is approximately 0.5 to 3 hours, but it is possible to optionally adjust the period depending on the condition of the raw material and the temperature or the like. There is no particular limitation on acids and alkalis to be used. It is possible to use acids such as hydrochloric acid, sulfuric acid, phosphoric acid, citric acid, tartaric acid, acetic acid, and formic acid, and alkalis such as sodium hydroxide, calcium hydroxide, sodium hydrogen carbonate, sodium carbonate, and ammonia. Additionally, extraction may be performed by using highly-pure cellulases, hemicellulases, or pectinases with which the target pectin having a star structure is not hydrolyzed, alone or in combination.

(Purification)

After insoluble fiber content is separated, the extracted pectic polysaccharides are subjected to esterolysis described below. Although it is possible to dry the pectic polysaccharides as they are, it is desirable to perform purification such as removal of protein, desalination, removal of pigment components in order to allow functions to be more developed. As for protein removal methods, it is possible to aggregate protein by pH adjustment, and then, to remove the protein by physical separation means such as pressure filtration separation, centrifugation, and membrane separation. Alternatively, it is possible to decompose protein using optional proteolytic enzymes, and then, to adsorb and remove the decomposed protein using dialysis membranes, activated carbon, ion exchange, or hydrophobic resins. As for desalination methods, any methods such as electrodialysis, ion exchange resins, or UF membrane separation can be used, if the methods are those for removing these. As for methods for removing pigment components, in addition to methods for decomposing pigment components, such as ozone treatment or UV irradiation, any methods such as partition with hydrophilic polar solvents such as ethanol or isopropanol can be used. It is preferred that one or more of these methods is used in combination. Pectic polysaccharides subjected to the purification treatment are subjected to optional sterilization treatment to thereby provide dried polysaccharides by means of methods such as freeze drying, spray drying, and hot-air drying of ethanol precipitates.

(Starch Removal)

In the case where starch is included in beans raw materials of the pectic polysaccharides of the present invention, it is possible to obtain pectic polysaccharides as it is, but, if the polysaccharides are used in an acidic protein beverage, there may be a case where precipitation is occurred because of the starch. Thus, it is preferred to remove starch in the stage of beans raw materials, in the stage of fiber separated from the beans raw materials, in the stage of extraction of pectic polysaccharides, or in the stage after extraction. It is possible to remove starch by combining one or more of methods for amylase decomposition, cooling precipitation, and aggregate precipitation with an emulsifier. Although dry fractionation is feasible if in the stage of raw materials, wet fractionation is suitable, wherein it is possible that the crushed raw material is added with water and heated to a temperature at which starch is not gelatinized to thereby allow the starch to be separated as starch particles by the centrifugation. Alternatively, it is also possible to decompose and remove starch by heating the raw material added with water to a temperature higher than the temperature at which the starch is gelatinized and then treating the raw material with amylase. If in the stage of fiber separated from beans raw materials, it is possible to decompose and remove starch by dispersing the fiber in water, heating the fiber to a temperature at which the starch is gelatinized, and then treating the fiber with amylase. Examples of methods for removing starch in the processes of extracting pectic polysaccharides or after extraction include adding amylase to a raw material added with water before extraction, adding amylase to extracted slurry before solid-liquid separation, or adding amylase to filtrate after solid-liquid separation.

Amylase is a generic name of enzymes that hydrolyze starch, and examples of amylase include β-amylase, α-amylase, glucoamylase, and pullulanase. Although these highly-purified amylases may be used for this purpose, commercially available amylase formulations in which one or more of these are mixed may be used. In this context, it is possible to decompose and remove starch by chemical approaches such as acid hydrolysis in the stage raw material, fiber, or before or after extraction of pectic polysaccharides, but starch removal treatment with enzyme treatment is preferred because pectic polysaccharides of the present invention are concurrently decomposed.

(Esterolysis)

The pectic polysaccharides of the present invention cannot obtain a function to disperse protein well unless the pectic polysaccharides undergo a process to reduce the degree of methyl esterification to 45% or less, preferably 30% or less. As for methods of removing methyl esters, any method may be used provided that the methods are those with which decomposition of sugar chains of the pectic polysaccharides is suppressed and the ester can be decomposed. When the treatment is performed on pectic polysaccharides after extraction, optional alkalis are added to a 1% to 5% by weight pectic polysaccharides aqueous solution to adjust the pH preferably to 8 or higher, more preferably to 12 or higher such that esterolysis is feasible. The heating condition is preferably 20° C. or more, more preferably 40° C. or more, and the heating period is preferably 10 minutes or more, more preferably 30 minutes or more, and also preferably 4 hours or less. By setting the pH at extraction to the alkaline side, it is possible to perform extraction and esterolysis concurrently. Alternatively, it is also possible to perform esterolysis using commercially available pectin methylesterases or commercially available enzyme formulations containing the enzyme. In this context, esterolysis can be performed in any stages for preparing pectic polysaccharides. Examples of the stages for ammonia treatment include the raw material before extraction, the slurry after extraction, the pectic polysaccharides solution subjected to solid-liquid separation, purified treatment liquids, and the powder after drying. In this context, as alkalis, any alkalis such as sodium hydroxide, calcium hydroxide, sodium hydrogen carbonate, sodium carbonate, and ammonia can be used. Additionally, the degree of methyl esterification is calculated, after the amounts of galacturonic acid and methyl-esterified galacturonic acid are quantified by Doesburg titration method, with the following formula.

methyl-esterified galacturonic acid/the total galacturonic acid×100(%)

(Dispersion Stabilizer)

The pectic polysaccharides of the present invention, whose degrees of methyl esterification of the constituent galacturonic acid are 45% or less, preferably 30% or less and which have a star structure with a molecule diameter of more than 100 nm and equal to or less than 200 nm, function as a dispersion stabilizer that suppresses aggregation of protein particles and maintains the stabilized dispersion state. The pH range is from pH 3.2 to pH 4.8, which is very wide. The pectic polysaccharides whose degrees of methyl esterification are 30% or less are particularly effective in the range of pH 3.4 to pH 4.5 and are suitable for acidic protein beverages such as drink yogurt in which fermented milk is used and acidic milk-based beverages prepared by directly adding acid. Additionally, the pectic polysaccharide whose degrees of methyl esterification are 35% to 45%, preferably 38% to 43% function as a dispersion stabilizer that suppresses aggregation of protein particles and maintains the stabilized dispersion state also in the pH range of pH 3.2 or more to less than pH 3.4. The stability of the conventional dispersion stabilizer such as pectin, carboxymethylcellulose, or water-soluble soybean polysaccharides is decreased in systems in which the content of nonfat milk solids is 3% by weight or more (the protein concentration of 1% by weight or more), preferably 6% by weight or more (the protein concentration of 2% by weight or more). For example, in a system in which the content of nonfat milk solids is 8.4% by weight (the protein concentration of 2.8% by weight), upper transparency or precipitation occurs after preservation for two weeks. In contrast, the pectic polysaccharides of the present invention almost do not produce upper transparency or precipitation under the same preservation condition.

As for the dispersion stabilizer of the present invention, the taste is less vagueness, and sourness and a milky taste are strongly felt, compared to pectin and the like conventionally used. Additionally, since the viscosity is low, it is possible to adjust beverages to optional viscosity and drinking feelings by blending gum agents, thickening agents, proteins or hydrolysates thereof as required. Examples of materials that can be combined include polysaccharides, such as starch, processed starch, various celluloses, agar, carrageenan, furcellaran, guar gum, locust bean gum, fenugreek gum, konjac mannan, tamarind seed polysaccharides, tara gum, gum arabic, tragacanth gum, karaya gum, pectin, xanthan gum, pullulan, and gellan gum, and protein, such as gelatin and collagen.

(Acidic Protein Beverage)

The acidic protein beverage of the present invention is an acidic protein beverage containing protein derived from animals and plants and includes concentrates such as drink bases. Those containing protein derived from animals refer to mainly animal milks, such as cow's milk and goat's milk, specifically cow's milk, skim milk, whole fat powdered milk, powdered skim milk, whey powder, butter milk, butter milk powder, sweetened milk, condensed milk, concentrated milk, processed milk fortified with minerals such as calcium and vitamins or the like, or fermented milk, and those containing proteins derived from plants refer to soybean milks obtained from soybean, specifically soybean milk, defatted soybean milk, powdered soybean milk, defatted soybean milk powder, isolated soybean protein, fermented products or the like. One or more beverages of these animal milks or soybean milks are combined, fermented with addition of microorganisms such as lactic acid bacteria, or added with fruit juices, organic acids such as lactic acid and citric acid, or inorganic acids such as phosphoric acid to adjust the pH of the beverages to acidic. These beverages are acidic protein beverages. The examples specifically include sterilized type or live bacteria-type lactic acid bacteria beverages, drink yogurts and kefir.

The dispersion stabilizer comprising pectic polysaccharides of the present invention, when milk protein is used, exerts its function effectively, suppresses aggregate precipitation of the protein, and maintains the stabilized dispersion state for a long period in an acidic protein beverage of which the content of nonfat milk solids is 3% by weight or more, that is, the protein concentration is 1% by weight or more. For an acidic protein beverage of which the content of nonfat milk solids is 6% by weight or more (the protein concentration of 2% by weight), the function becomes more pronounced.

The pectic polysaccharides of the present invention can stabilize dispersion of protein particles in a wide pH range of pH 3.2 to 4.8, particularly pH 3.4 to pH 4.5 by being added to an acidic protein beverage at 0.05 to 5% by weight, more preferably at 0.1 to 2% by weight, and further preferably at 0.2 to 1% by weight. Although the dispersion stabilizer may adversely affect on the taste of the beverage when blended at a high concentration, in the case of pectic polysaccharides derived from pea, influence on the flavor like citrus pectin and water-soluble soybean polysaccharides is very low, even when blended to an acidic protein beverage at 5% by weight.

It is preferred to perform homogenization treatment on the acidic protein food of the present invention in order to enhance the dispersion stability of protein particles. Examples of homogenizing equipment include, without limitation, high-pressure homogenizers, homo mixers, Clear Mix, and Nanomizer. The homogenization pressure cannot be unequivocally determined because the flowability is not constant depending on the solids concentration of the acidic protein beverages, but a pressure from 50 kgf/cm$^2$ to 500 kgf/cm$^2$ is preferred. Additionally, although the homogenization treatment may be performed at any stages in the process for producing an acidic protein beverage, it is preferable to perform the treatment after the protein is dispersed in water, after the protein is fermented or an acid is added, as well as after the dispersion stabilizer of the present invention is added.

EXAMPLES

The present invention is explained by describing Examples hereinafter, but the technical idea of the present invention is not to be limited to these exemplifications. In this context, % in Examples is intended to mean weight bases, unless otherwise described.

Production Example 1

Fifty kilograms of pea seeds (Yellow Peas) were hulled, subsequently, added with five times the amount of water, and immersed for 24 hours. The seeds were crushed with a homomixer (5,000 rpm, for 30 minutes), and protein and starch were extracted. Constituents dispersed in water, such as protein and starch were removed using a centrifuge at 1,500×g for 20 minutes, and fiber was collected. Furthermore, the fiber was added with five times the amount of water, stirred with the homomixer (3,000 rpm, for 30 minutes), and collected by the centrifugation (1,500×g, for 20 minutes). This operation was repeated twice, and freeze drying was performed to thereby obtain 10 kg of pea fiber. In 920 parts of water, 80 parts of pea fiber were dispersed. After the pH was adjusted to 5 using hydrochloric acid, the dispersed fiber was heated at 120° C. for 90 minutes to extract pectic polysaccharides. The insoluble fiber was removed by the centrifugation (5,000 rpm, for 30 minutes), and the supernatant was collected. This supernatant was warmed to 40° C., adjusted to pH 12 with alkali, retained for 60 minutes, and thus subjected to demethylesterification treatment. The treated supernatant was adjusted to pH 7 with addition of hydrochloric acid and warmed to 60° C., then amylase (BAN480L Novozyme) corresponding to 0.1% by weight of the solids were added to decompose the starch for an hour. The decomposed starch was adjusted to pH 5 with hydrochloric acid, added with ethanol to achieve 60% by weight so as to precipitate pectic polysaccharides, and washed with aqueous ethanol of 90% by weight. The obtained precipitation was air dried to thereby obtain pea pectin A.

Production Example 2

Comparison of pH at Extraction

In the method for producing pea pectin A, exactly in same way except that the pH at extraction was set to 2, 3, 4, 6, 9, 12, or 13, and demethylesterification treatment was not performed, pea pectins B, C, D, E, F, G, and H were obtained.

Production Example 3

Comparison of Demethylesterification Treatment

In the method for producing pea pectin A, exactly in the same way except that pH at demethylesterification treatment was set to 8, 10, or 14, pea pectins I, J, and K were obtained.

(Atomic Force Microscope Observation of Molecular Structure)

The molecular structures of the pea pectin A and commercially available HM-pectin (GENUPECTIN type USP-H: CP Kelco) were observed with an atomic force microscope. The result is shown in FIG. 1. It was possible to observe that, as for molecular structures observed by drying on mica, pea pectin A (FIG. 1, left) has a star structure and HM-pectin (FIG. 1, right) has a linear structure.

Example 1

Measurement of Molecular Structure, Molecule Diameter, and Absolute Molecular Weight The molecular shape and molecular diameter of pea pectins A to K were observed with an atomic force microscope. Additionally, the absolute molecular weight and molecular rotation radius of polymeric components whose molecular weights are 10,000 or more were measured with static light scattering (HPLC-MALLS). The analysis conditions for HPLC gel filtration chromatography are as follows. A 1% by weight pea pectin aqueous solution (a 50 mM sodium acetate aqueous solution, pH 5.0) was prepared, and a filtrate filtered with a 0.8 µm filter was subjected to analysis. To a TSK-gel G-6000PWXL column (TOSOH CORPORATION; ϕ7.8 mm×300 mm) pre-equilibrated with a 50 mM sodium acetate aqueous solution, pH 5.0 at 40° C., 20 µL of the filtrate was added and separated at a flow rate: 1.0 mL/min. The separated polysaccharides were detected with a differential refractive index detector (RI detector), and the molecular weight was calculated from a standard pullulan P-82 (Showa Denko K. K.). The result is summarized in Table 1.

TABLE 1

Molecular Structure of Each Extracted Polysaccharide

|  |  | pH at extraction | pH at deesterification | Molecular shape | Molecular diameter (nm) | Average absolute molecular weight | Molecular rotation radius (nm) |
|---|---|---|---|---|---|---|---|
| Pea pectin | A | 5 | 12 | Star shape | <180 | 850,000 | 36 |
|  | B | 2 | — | Spherical/linear | <50 | <10,000 | 10 |
|  | C | 3 | — | Spherical/linear | <100 | 200,000 | 14 |
|  | D | 4 | — | Star shape | <150 | 500,000 | 25 |
|  | E | 6 | — | Star shape | <200 | 1,000,000 | 40 |
|  | F | 9 | — | Star shape | <180 | 900,000 | 35 |
|  | G | 12 | — | Star shape | <150 | 800,000 | 32 |

TABLE 1-continued

Molecular Structure of Each Extracted Polysaccharide

| | | pH at extraction | pH at deesterification | Molecular shape | Molecular diameter (nm) | Average absolute molecular weight | Molecular rotation radius (nm) |
|---|---|---|---|---|---|---|---|
| | H | 13 | — | Spherical/linear | <100 | 380,000 | 24 |
| | I | 5 | 8 | Star shape | <180 | 900,000 | 38 |
| | J | 5 | 10 | Star shape | <180 | 900,000 | 38 |
| | K | 5 | 14 | Star shape | <150 | 800,000 | 30 |
| Water-soluble soybean polysaccharides | | — | — | Spherical/star shape | <100 | 450,000 | 23 |
| HM pectin | | — | — | Linear | 300< | 1,200,000 | 100< |

Figure 2:
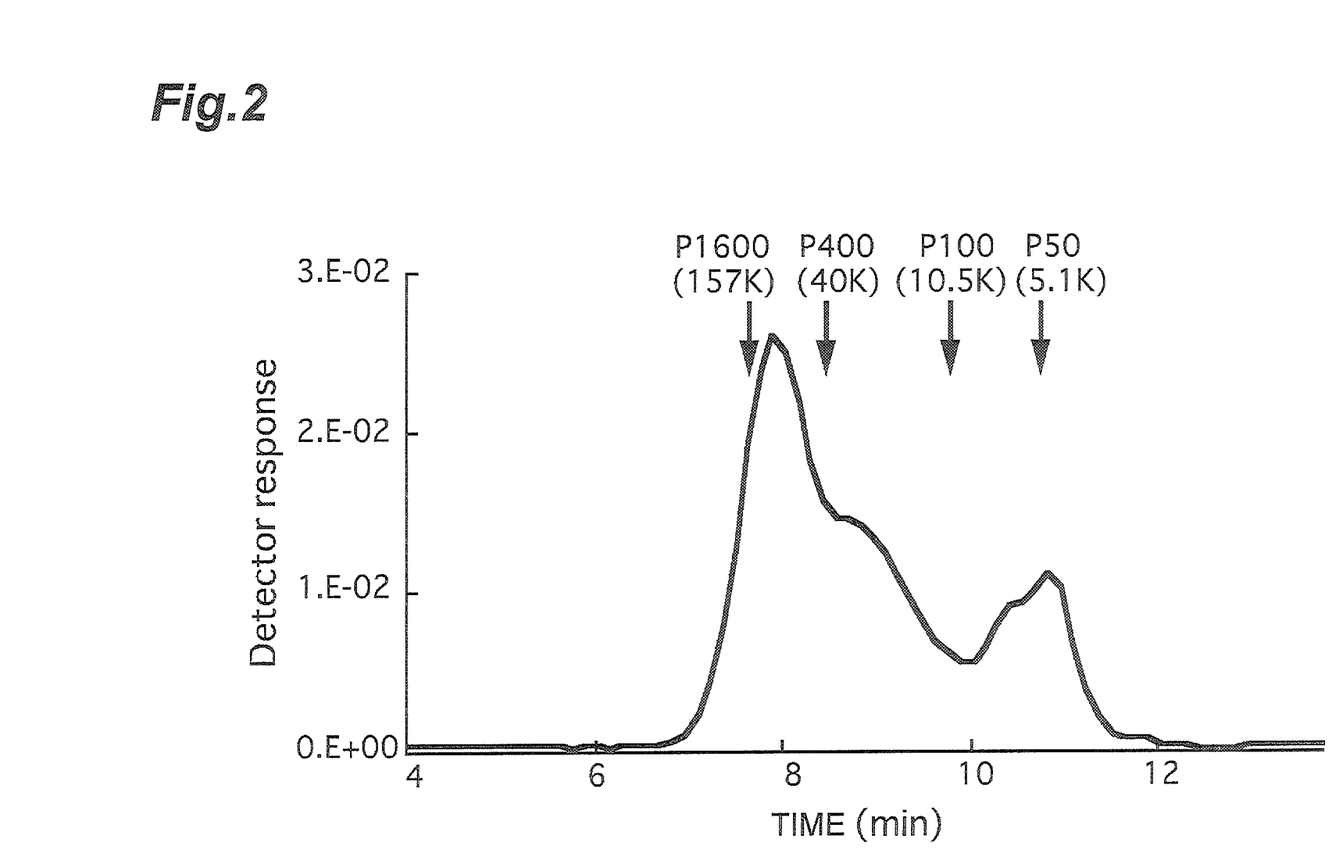
FIG. 2 is an example of the molecular weight distribution by gel filtration of pea pectin A.

According to the HPLC analysis, any above-described polysaccharides derived from pea were composed of a molecular weight of 5 million or less, and the polymeric components of 10,000 or more accounted for 50% or more of the molecular weight distribution (FIG. 2). In the pea pectins B, C, and H, since decomposition was facilitated at extraction, the star structure was not observed, and the molecular diameter was small as 100 nm or less. Additionally, the molecular rotation radius in an aqueous medium was less than 25 nm, and the average absolute molecular weight of the polymeric major components was small as 400,000 or less. In contrast, as for pea pectin other than B, C, and H, the molecular rotation radius was estimated to be 25 nm to 40 nm, and the average absolute molecular weight (MM) was estimated to be 500,000 to 1,000,000.

Example 2

Sugar Composition and Degree of Methyl Esterification

The measurement results of the sugar composition and the degree of esterification of the pea pectins A to K were summarized in Table 2.

Although pectic polysaccharides containing galacturonic acid are obtained irrespective of extraction conditions, under a extraction condition of pH 3 or less (pea pectins B and C), the arabinose content is decreased to less than 40%. In alkali extraction at pH 9 or more (pea pectins F, G, and H), methyl ester was prone to be significantly decomposed. In alkali treatment after extraction (pea pectins I, J, A, and K), methyl ester was prone to be decomposed in each case, but decomposition was significantly observed in particular under the treatment condition of pH 10 or more (J, A, K).

Example 3

Production of an Acidic Milk-based Beverage and Evaluation of Stability (A System of Protein Concentration of 2.8% by Weight and 0.4% by Weight Stabilizer)

—Preparation of Fermented Milk

An aqueous solution containing 21% by weight powdered skim milk (produced by Yotsuba Milk Products Co., Ltd) was prepared and heat sterilized at 95° C. with stirring. After cooling, commercially available plain yogurt was inoculated and fermented in an incubator at 40° C. until pH reached to 4.7. The fermented yogurt was passed through a homogenizer under a pressure of 150 kgf/cm$^2$ to be homogenized.

TABLE 2

Sugar Composition and Degree of Methyl Esterification

| | | pH at extraction | pH at deesterification | DE (%) | Sugar composition (%) | | | | | | |
|---|---|---|---|---|---|---|---|---|---|---|---|
| | | | | | GalA | Ara | Gal | Glc | Rha | Xyl | Fuc |
| Pea pectin | A | 5 | 12 | 14.8 | 16.5 | 43.8 | 20.3 | 8.2 | 6.6 | 4.1 | 0.5 |
| | B | 2 | — | 50.6 | 18.9 | 20.6 | 32.8 | 10.4 | 9.2 | 6.7 | 1.4 |
| | C | 3 | — | 58.2 | 16.4 | 37.6 | 28.6 | 6.4 | 5.1 | 3.0 | 2.9 |
| | D | 4 | — | 60.5 | 17.1 | 40.4 | 31.9 | 5.7 | 3.2 | 1.4 | 0.3 |
| | E | 6 | — | 58.6 | 18.3 | 46.8 | 18.7 | 6.5 | 3.7 | 5.5 | 0.5 |
| | F | 9 | — | 50.2 | 15.8 | 45.3 | 19.2 | 10.4 | 3.2 | 4.6 | 1.5 |
| | G | 12 | — | 20.4 | 15.0 | 43.2 | 23.7 | 8.8 | 4.0 | 3.2 | 2.1 |
| | H | 13 | — | 16.2 | 17.3 | 44.4 | 10.5 | 14.2 | 5.8 | 6.3 | 1.5 |
| | I | 5 | 8 | 40.6 | 17.1 | 41.5 | 23.2 | 7.8 | 6.0 | 3.2 | 1.2 |
| | J | 5 | 10 | 29.5 | 16.9 | 47.1 | 19.9 | 8.2 | 4.9 | 2.7 | 0.3 |
| | K | 5 | 14 | 10.2 | 15.8 | 45.2 | 18.1 | 9.0 | 4.1 | 7.4 | 0.4 |
| Water-soluble soybean polysaccharides | | — | — | 55.6 | 24.3 | 15.6 | 46.7 | 5.4 | 3.9 | 2.8 | 1.3 |
| HM pectin | | — | — | 68.2 | 80.4 | 3.7 | 6.8 | 0.8 | 4.4 | 2.4 | 1.5 |

DE (%): The degree of methyl esterification (%)
GalA: Galacturonic acid, Ara: Arabinose, Gal: Galactose, Glc: Glucose, Rha: Rhamnose, Xyl: Xylose, Fuc: Fucose —Preparation of an Acidic Milk-Based Beverage Twenty parts of a 2% by weight aqueous solution of pea pectins A to K, 14 parts of a 50% by weight granulated sugar aqueous solution, and 26 parts of water were mixed and cooled to 4° C. To this, 40 parts of fermented milk cooled as well was added with stirring, and adjusted to an optional pH from pH 4.5 to pH 3.4 (pH 3.2 in part) with a 50% by weight lactic acid solution. The prepared solution was homogenized with a homogenizer (150 kgf/cm$^2$), transferred to and sealed in a glass bottle, and then heat sterilized in a hot water bath at 80° C. for 20 minutes. In this context, in the acidic milk-based beverage prepared with the above-described formulation, the content of nonfat milk solids is 8.4% by weight and the amount of the added stabilizer is 0.4% by weight. In this context, water-soluble soybean polysaccharides (SOYAFIBE-S-LA200: Fuji Oil Co., Ltd.) and HM-pectin (GENUPECTIN type USP-H: CP Kelco) were made the objects for comparison. The protein concentration of the acidic milk-based beverage is 2.8% by weight.

—Evaluation of the Stability of the Acidic Milk-based Beverage

As for the prepared acidic milk-based beverage, the stability was evaluated by its viscosity, precipitation ratio, upper transparency, and the total evaluation summing these. The result is shown in Table 3 below. Additionally, each measurement evaluation method is shown in the following.

[Viscosity]

Viscosity of the prepared acidic milk-based beverage is measured at 10° C. on the following day of preparation and after preservation of two weeks with a BM type viscometer, No. 1 rotor, at 60 rotation.

[Precipitation Ratio]

Twenty grams of the acidic milk-based beverage preserved for two weeks is measured off into a centrifuge tube and centrifuged with a KOKUSAN centrifuge at 2,000 rpm for 20 minutes. The supernatant is decanted off, and the weight of precipitation is measured. In this context, the precipitation ratio is calculated by the following calculation formula.

Precipitation ratio(%)=(Weight of precipitation)/(Weight of the fractionated acidic milk-based beverage)×100

As for precipitation ratio, the precipitation ratio less than 1% is shown as A, the precipitation ratio of 1% or more to less than 1.5% is shown as B, the precipitation ratio of 1.5% or more to less than 3% is shown as C, and the precipitation ratio of 3% or more is shown as D.

[Upper Transparency]

The presence or absence of aggregation after heat sterilization and the presence or absence of upper transparency at the solution upper surface after settled for a day or two weeks are determined by observing visually. The presence of upper transparency is shown as + and the absence of upper transparency is shown as −.

[Total Evaluation]

Taken together the items for evaluating stability described above, very good stability is shown as A, good as B, slightly good as C, and bad as D.

TABLE 3

Stability of the acidic milk-based beverage

| | | Acidic milk pH | One day after preparation | | | Two weeks after preparation | | | Total evaluation |
|---|---|---|---|---|---|---|---|---|---|
| | | | Viscosity | Precipitation ratio | Upper transparency | Viscosity | Precipitation ratio | Upper transparency | |
| Pea pectin | A | 3.4 | 16.5 | A | − | 19.0 | B | − | B |
| | | 3.6 | 16.0 | A | − | 17.5 | A | − | A |
| | | 3.8 | 13.5 | A | − | 14.5 | A | − | A |
| | | 4.0 | 13.5 | A | − | 15.2 | A | − | A |
| | | 4.2 | 14.6 | A | − | 18.8 | A | − | A |
| | | 4.4 | 16.5 | A | − | 20.0 | B | − | B |
| | | 4.6 | 24.0 | C | − | 35.4 | C | + | C |
| | B | 3.4 | 350 | D | + | 240 | D | + | D |
| | | 3.6 | 400 | D | + | 280 | D | + | D |
| | | 3.8 | 85.5 | D | + | 120 | D | + | D |
| | | 4.0 | 70.5 | D | + | 194 | D | + | D |
| | | 4.2 | 110 | D | + | 160 | D | + | D |
| | | 4.4 | 360 | D | + | 380 | D | + | D |
| | | 4.6 | 400 | D | + | 360 | D | + | D |
| | C | 3.4 | 450 | D | + | 340 | D | + | D |
| | | 3.6 | 340 | D | + | 420 | D | + | D |
| | | 3.8 | 75 | D | + | 160 | D | + | D |
| | | 4.0 | 65 | D | + | 125 | D | + | D |
| | | 4.2 | 185 | D | + | 250 | D | + | D |
| | | 4.4 | 300 | D | + | 350 | D | + | D |
| | | 4.6 | 340 | D | + | 310 | D | + | D |
| | D | 3.4 | 45.5 | D | + | 124 | D | + | D |
| | | 3.6 | 30.2 | B | − | 35.5 | C | + | C |
| | | 3.8 | 18.8 | A | − | 20.5 | A | − | A |
| | | 4.0 | 16.5 | A | − | 18.5 | A | − | A |
| | | 4.2 | 19.0 | B | − | 20.0 | B | − | B |
| | | 4.4 | 48.5 | D | + | 84.0 | D | + | D |
| | | 4.6 | 98.4 | D | + | 140 | D | + | D |
| | E | 3.4 | 35.5 | D | + | 80.4 | D | + | D |
| | | 3.6 | 28.4 | B | − | 36.4 | C | + | C |
| | | 3.8 | 19.0 | A | − | 20.5 | A | − | A |
| | | 4.0 | 18.4 | A | − | 18.4 | A | − | A |
| | | 4.2 | 20.6 | B | − | 18.8 | B | − | B |
| | | 4.4 | 44.8 | C | + | 64.0 | D | + | D |
| | | 4.6 | 84.2 | D | + | 240.0 | D | + | D |

TABLE 3-continued

| | | Stability of the acidic milk-based beverage | | | | | | |
|---|---|---|---|---|---|---|---|---|
| | | Acidic | One day after preparation | | | Two weeks after preparation | | |
| | | milk pH | Viscosity | Precipitation ratio | Upper transparency | Viscosity | Precipitation ratio | Upper transparency | Total evaluation |
| | F | 3.2 | 52.5 | D | + | 88.0 | D | + | D |
| | | 3.4 | 30.8 | C | + | 64.4 | C | + | D |
| | | 3.6 | 19.6 | B | − | 29.5 | C | + | C |
| | | 3.8 | 19.0 | A | − | 19.4 | A | − | A |
| | | 4.0 | 18.2 | A | − | 20.4 | A | − | A |
| | | 4.2 | 18.4 | B | − | 20.0 | B | − | B |
| | | 4.4 | 34.5 | C | + | 48.4 | D | + | D |
| | | 4.6 | 64.2 | D | + | 86.0 | D | + | D |
| | G | 3.4 | 26.8 | B | − | 30.2 | B | − | B |
| | | 3.6 | 19.6 | A | − | 24.5 | B | − | B |
| | | 3.8 | 16.5 | A | − | 18.0 | A | − | A |
| | | 4.0 | 18.5 | A | − | 18.2 | A | − | A |
| | | 4.2 | 18.0 | A | − | 22.4 | B | − | B |
| | | 4.4 | 24.5 | A | − | 34.6 | B | − | B |
| | | 4.6 | 44.5 | C | − | 48.2 | C | + | C |
| | H | 3.4 | 76.6 | D | + | 110.0 | D | + | D |
| | | 3.6 | 42.5 | D | + | 68.2 | D | + | D |
| | | 3.8 | 22.5 | C | + | 40.4 | C | + | D |
| | | 4.0 | 28.6 | A | − | 25.6 | B | − | B |
| | | 4.2 | 20.8 | B | − | 19.8 | B | − | B |
| | | 4.4 | 33.6 | B | − | 40.0 | C | + | C |
| | | 4.6 | 42.8 | C | + | 56.8 | C | + | D |
| | I | 3.2 | 30.5 | B | − | 30.8 | B | + | B |
| | | 3.4 | 30.4 | B | + | 30.6 | C | − | C |
| | | 3.6 | 24.0 | B | − | 26.2 | C | − | C |
| | | 3.8 | 15.8 | A | − | 14.5 | A | − | A |
| | | 4.0 | 18.5 | A | − | 15.2 | A | − | A |
| | | 4.2 | 20.2 | A | − | 18.8 | A | − | A |
| | | 4.4 | 34.6 | B | − | 30.4 | C | + | C |
| | | 4.6 | 40.5 | C | − | 60.4 | C | + | D |
| | J | 3.2 | 40.4 | C | + | 45.0 | C | + | C |
| | | 3.4 | 16.0 | A | − | 18.8 | A | − | A |
| | | 3.6 | 16.4 | A | − | 15.8 | A | − | A |
| | | 3.8 | 14.6 | A | − | 14.4 | A | − | A |
| | | 4.0 | 14.0 | A | − | 16.2 | A | − | A |
| | | 4.2 | 14.2 | A | − | 16.4 | A | − | A |
| | | 4.4 | 15.8 | A | − | 18.6 | A | − | A |
| | | 4.6 | 38.6 | C | − | 46.5 | C | + | C |
| | K | 3.4 | 15.4 | A | − | 20.0 | A | − | A |
| | | 3.6 | 14.2 | A | − | 16.6 | A | − | A |
| | | 3.8 | 13.8 | A | − | 18.0 | A | − | A |
| | | 4.0 | 13.0 | A | − | 17.4 | A | − | A |
| | | 4.2 | 12.8 | A | − | 18.0 | A | − | A |
| | | 4.4 | 22.8 | A | − | 24.2 | A | − | A |
| | | 4.6 | 36.2 | C | − | 45.0 | C | + | C |
| Water-soluble soybean polysaccharides | | 3.4 | 16.4 | A | − | 18.0 | A | − | A |
| | | 3.6 | 14.0 | A | − | 14.6 | A | − | A |
| | | 3.8 | 10.6 | A | − | 14.0 | B | − | A |
| | | 4.0 | 12.6 | A | − | 30.8 | D | + | D |
| | | 4.2 | 28.4 | C | + | 48.5 | D | + | D |
| | | 4.4 | 40.4 | D | + | 96.0 | D | + | D |
| | | 4.6 | 260 | D | + | 400 | D | + | D |
| HM pectin | | 3.4 | 400 | D | + | 400 | D | + | D |
| | | 3.6 | 48.4 | B | + | 82.4 | B | + | C |
| | | 3.8 | 36.2 | A | − | 35.6 | A | − | A |
| | | 4.0 | 26.8 | A | − | 28.4 | A | − | A |
| | | 4.2 | 32.0 | A | − | 36.0 | A | − | A |
| | | 4.4 | 40.6 | B | − | 44.5 | B | − | B |
| | | 4.6 | 1000 | D | − | 1000 | D | + | D |

The pea pectin extracted in the range of pH 4 to pH 12 had a star structure, the molecule diameter was more than 100 nm and equal to or less than 200 nm, and additionally, the molecular rotation radius of the polymeric component was from 25 nm to 40 nm, and the absolute molecular weight was from 500,000 to 1,000,000. Among these, G, of which extraction pH is high, and A, J, and K, to which alkaline treatment more than pH 10 was performed were those that showed values such as the degree of methyl esterification of galacturonic acid of 30% or less and arabinose content of 30% by weight or more. The pea pectin was able to stabilize protein in a high protein system of a protein concentration of 2.8% by weight (the content of nonfat milk solids of 8.4%) in a wide pH range from pH 3.4 to pH 4.6, and was able to firmly stabilize protein particularly in a pH range from pH 3.4 to 4.4. Additionally, acidic milk-based beverage for which stability was observed was low in viscosity and finished with a refreshing taste. Additionally, for I, whose degree of methyl esterification was relatively high, 40.6%, stabilization of protein was observed at pH 3.2, in addition to the pH range of 3.8 to 4.4.

Example 4

Production of an Acidic Milk-based Beverage and Evaluation of Stability (A System of Protein Concentration of 1.0% by Weight and 0.05 to 5% by Weight Stabilizer)

In the methods for preparing an acidic milk-based beverage and for evaluating stability of Example 3, an acidic milk-based beverage was prepared completely similarly except that the protein concentration was 1.0% by weight (the content of nonfat milk solids of 3.0% by weight) and the amount of pea pectin A as the stabilizer to be blended was 0.02, 0.05, 0.1, 0.5, 1, 5, and 10% by weight, and the stability was evaluated.

TABLE 4

Stability of the acidic milk-based beverage

| | The amount of stabilizer added | Acidic milk pH | One day after preparation | | | Two weeks after preparation | | | Total evaluation |
|---|---|---|---|---|---|---|---|---|---|
| | | | Viscosity | Precipitation ratio | Upper transparency | Viscosity | Precipitation ratio | Upper transparency | |
| Pea pectin A | 0.02 | 3.4 | 240 | D | + | 400 | D | + | D |
| | | 3.6 | 280 | D | + | 600 | D | + | D |
| | | 3.8 | 82.5 | C | + | 160 | D | + | D |
| | | 4.0 | 88.0 | C | + | 124 | D | + | D |
| | | 4.2 | 120 | C | + | 260 | D | + | D |
| | | 4.4 | 400 | D | + | 440 | D | + | D |
| | | 4.6 | 1000 | D | + | 1000 | D | + | D |
| | 0.05 | 3.4 | 84.6 | B | − | 19.0 | B | + | B |
| | | 3.6 | 42.5 | A | − | 30.5 | A | − | B |
| | | 3.8 | 20.5 | A | − | 38.5 | A | − | A |
| | | 4.0 | 24.5 | A | − | 30.4 | A | − | A |
| | | 4.2 | 28.0 | A | − | 34.6 | A | − | A |
| | | 4.4 | 66.5 | B | − | 45.5 | B | + | B |
| | | 4.6 | 121 | C | + | 225 | D | + | D |
| | 0.1 | 3.4 | 80.5 | B | − | 19.0 | B | + | B |
| | | 3.6 | 34.6 | A | − | 30.8 | A | − | A |
| | | 3.8 | 19.5 | A | − | 26.5 | A | − | A |
| | | 4.0 | 18.4 | A | − | 24.8 | A | − | A |
| | | 4.2 | 20.4 | A | − | 27.8 | A | − | A |
| | | 4.4 | 29.8 | B | − | 35.4 | B | − | B |
| | | 4.6 | 59.4 | C | + | 86.8 | C | + | D |
| | 0.5 | 3.4 | 29.6 | A | − | 53.6 | B | − | B |
| | | 3.6 | 28.4 | A | − | 34.4 | A | − | A |
| | | 3.8 | 28.2 | A | − | 40.4 | A | − | A |
| | | 4.0 | 31.5 | A | − | 38.5 | A | − | A |
| | | 4.2 | 28.6 | A | − | 26.0 | A | − | A |
| | | 4.4 | 39.2 | A | − | 44.8 | B | − | B |
| | | 4.6 | 50.2 | C | − | 63.4 | C | + | C |
| | 1 | 3.4 | 105 | A | − | 160 | B | − | B |
| | | 3.6 | 86.4 | A | − | 106 | A | − | A |
| | | 3.8 | 60.5 | A | − | 80.4 | A | − | A |
| | | 4.0 | 58.2 | A | − | 55.0 | A | − | A |
| | | 4.2 | 70.4 | A | − | 89.6 | A | − | A |
| | | 4.4 | 64.6 | A | − | 74.8 | B | − | B |
| | | 4.6 | 110 | C | − | 161 | C | + | C |
| | 5 | 3.4 | 240 | B | − | 240 | B | − | B |
| | | 3.6 | 120 | A | − | 184 | A | − | A |
| | | 3.8 | 151 | A | − | 168 | A | − | A |
| | | 4.0 | 141 | A | − | 110 | A | − | A |
| | | 4.2 | 120 | A | − | 116 | A | − | A |
| | | 4.4 | 250 | B | − | 320 | B | − | B |
| | | 4.6 | 1000 | C | + | 1000 | D | + | D |
| | 10 | 3.4 | 440 | D | − | 480 | D | − | D |
| | | 3.6 | 260 | B | − | 320 | B | − | D |
| | | 3.8 | 146 | B | − | 185 | B | − | D |

TABLE 4-continued

Stability of the acidic milk-based beverage

| The amount of stabilizer added | Acidic milk pH | One day after preparation | | | Two weeks after preparation | | | Total evaluation |
|---|---|---|---|---|---|---|---|---|
| | | Viscosity | Precipitation ratio | Upper transparency | Viscosity | Precipitation ratio | Upper transparency | |
| | 4.0 | 140 | B | – | 160 | B | – | D |
| | 4.2 | 126 | B | – | 144 | B | – | D |
| | 4.4 | 265 | B | – | 305 | B | – | D |
| | 4.6 | 1000 | D | – | 1000 | C | – | D |

The pea pectin A in a range of amount to be blended from 0.05% by weight to 5% by weight was able to stabilize dispersion of milk protein in a wide pH range from pH 3.4 to pH 4.4. When 10% by weight pea pectin A was added to an acidic milk-based beverage of which protein concentration is 1.0% by weight (the content of nonfat milk solids of 3.0% by weight), the stability of the protein was observed, but the unique refreshing taste was prone to be impaired because the viscosity of the pectin itself affected.

Example 5

Production of Acidic Soybean Milk-based Beverage and Evaluation of Stability

—Preparation of Fermented Soybean Milk

An aqueous solution containing 10.5% by weight defatted soybean milk powder derived from soybean (manufactured by Fuji Oil Co., Ltd.) was prepared and heat sterilized at 95° C. with stirring. After cooling, commercially available plain yogurt was inoculated and fermented in an incubator at 40° C. until pH reached to 4.7. The fermented yogurt was passed through a homogenizer under a pressure of 100 kgf/cm² to be homogenized.

Preparation of an Acidic Soybean Milk-Based Beverage

Twenty parts of a 1% by weight aqueous solution of pea pectin A, 14 parts of a 25% by weight granulated sugar aqueous solution, and 26 parts of water were mixed and cooled to 4° C. To this, 40 parts of fermented soybean milk cooled as well was added with stirring, and adjusted to an optional pH from pH 4.6 to pH 3.4 with a 50% by weight lactic acid solution. The prepared solution was homogenized with a homogenizer (100 kgf/cm²), transferred to and sealed in a glass bottle, and then heat sterilized in a hot water bath at 80° C. for 20 minutes. In this context, in the acidic soybean milk-based beverage prepared with the above-described formulation, the protein concentration is 2.7% by weight and the amount of the added stabilizer is 0.2% by weight.

Pea pectin A has a function to stabilize dispersion of soybean protein as well as milk protein under acidic conditions, and an acidic soybean milk-based beverage with a refreshing taste was obtained.

INDUSTRIAL APPLICABILITY

The present invention provides a dispersion stabilizer for acidic protein beverages, that is, a dispersion stabilizer that suppresses aggregate precipitation of protein occurred under acidic conditions. Through the use of the dispersion stabilizer of the present invention, it is possible to provide an acidic protein beverage of low viscosity and with a refreshing taste in a wide range of pH 3.2 to 4.8, particularly of pH 3.4 to pH 4.5.

The invention claimed is:

1. A pectic polysaccharide, wherein a degree of methyl esterification of constituent galacturonic acid is 45% or less, a structure of a single molecule observed with an atomic force microscope comprises a star structure, and a diameter of the molecule is more than 100 nm and equal to or less than 200 nm and the pectic polysaccharide is derived from a pea seed.

2. The pectic polysaccharide according to claim 1, wherein the degree of esterification is 30% or less.

3. The pectic polysaccharide according to claim 1, wherein the degree of esterification is 35% to 45%.

4. The pectic polysaccharide according to claim 1, wherein, among constituents, a polymeric component whose molecular weight is 10,000 or more has a molecular rotation radius of 25 nm to 40 nm when dispersed in an aqueous medium and an average absolute molecular weight of 500,000 to 1,000,000.

5. The pectic polysaccharide according to claim 1, wherein the pectic polysaccharide comprises arabinose, galactose, glucose, rhamnose, xylose, fucose, and galacturonic acid as constituent saccharides, and an arabinose content is 30% by weight or more.

TABLE 5

Evaluation of the stability of the acidic soybean milk-based beverage

| | | Soybean milk pH | One day after preparation | | | Two weeks after preparation | | | Total evaluation |
|---|---|---|---|---|---|---|---|---|---|
| | | | Viscosity | Precipitation ratio | Upper transparency | Viscosity | Precipitation ratio | Upper transparency | |
| Pea pectin | A | 3.4 | 14.5 | A | – | 22.4 | B | – | B |
| | | 3.6 | 12.4 | A | – | 14.0 | A | – | A |
| | | 3.8 | 11.6 | A | – | 12.5 | A | – | A |
| | | 4.0 | 12.8 | A | – | 14.2 | A | – | A |
| | | 4.2 | 11.0 | A | – | 12.5 | A | – | A |
| | | 4.4 | 14.6 | A | – | 14.4 | B | + | B |
| | | 4.6 | 58.4 | D | + | 110.5 | D | + | D |

6. A method for producing a pectic polysaccharide, the method comprising:

obtaining a pectic polysaccharide by extraction from a pea seed or fibrous fraction thereof as a raw material with an aqueous medium of pH 3 to pH 12; and performing enterolysis such that a degree of methyl esterification is 45% or less.

7. An acidic protein beverage comprising the pectic polysaccharide according to claim 1.

8. The acidic protein beverage according to claim 7, wherein a protein content is 1% by weight or more in the beverage.

9. A method for stabilizing dispersion in a protein beverage. the method comprising adding the pectic polysaccharide according to claim 1 to a protein beverage.

10. The method for stabilizing dispersion in a protein beverage according to claim 9 wherein the protein beverage is an acidic protein beverage whose protein content is 1% by weight or more in the beverage.

11. The method according to claim 6, wherein the degree of methyl esterification is 30% or less.

12. An acidic protein beverage comprising the pectic polysaccharide produced in the method according to claim 6.

13. The acidic protein beverage according to claim 12, wherein a protein content is 1% by weight or more in the beverage.

14. A method for stabilizing dispersion in a protein beverage, the method comprising adding the pectic polysaccharide produced in the production method according to claim 6 to a protein beverage.

15. The method for stabilizing dispersion according to claim 14, wherein the protein beverage is an acidic protein beverage whose protein content is 1% by weight or more in the beverage.

\* \* \* \* \*

UNITED STATES PATENT AND TRADEMARK OFFICE
CERTIFICATE OF CORRECTION

| | | |
|---|---|---|
| PATENT NO. | : 9,107,450 B2 | Page 1 of 1 |
| APPLICATION NO. | : 14/128120 | |
| DATED | : August 18, 2015 | |
| INVENTOR(S) | : Nakamura et al. | |

It is certified that error appears in the above-identified patent and that said Letters Patent is hereby corrected as shown below:

Title Page

On page 1, item (73) correct the Assignee name

"FUJI OIL COMAPNY LIMITED"

to -- FUJI OIL COMPANY LIMITED --.

Signed and Sealed this
Ninth Day of February, 2016

Michelle K. Lee
*Director of the United States Patent and Trademark Office*